United States Patent

Fujimoto et al.

[11] Patent Number: 5,693,998
[45] Date of Patent: Dec. 2, 1997

[54] OSCILLATION GYROSCOPE

[75] Inventors: Katsumi Fujimoto, Toyama-ken; Takeshi Nakamura, Uji, both of Japan

[73] Assignee: Murata Manufacturing Co., Ltd., Japan

[21] Appl. No.: 620,787

[22] Filed: Mar. 28, 1996

[30] Foreign Application Priority Data

Mar. 31, 1995 [JP] Japan ................... 7-100282

[51] Int. Cl.$^6$ .................... H01L 41/08
[52] U.S. Cl. ............ 310/366; 310/321; 310/358; 310/316
[58] Field of Search .................... 310/366, 321, 310/323, 328, 316, 317, 319, 358, 330–332; 73/505, 517 AV, 517 R

[56] References Cited

U.S. PATENT DOCUMENTS

| | | | |
|---|---|---|---|
| 3,520,195 | 7/1970 | Tehon | 73/504.14 |
| 4,431,935 | 2/1984 | Rider | 310/331 |
| 4,742,264 | 5/1988 | Ogawa | 310/332 |
| 4,759,107 | 7/1988 | Ogawa et al. | 310/328 X |
| 4,799,385 | 1/1989 | Hulsing et al. | 73/505 |
| 5,012,174 | 4/1991 | Adkins et al. | 318/649 |
| 5,117,148 | 5/1992 | Nakamura et al. | 310/367 |
| 5,118,982 | 6/1992 | Inoue et al. | 310/366 |
| 5,241,236 | 8/1993 | Sasaki et al. | 310/358 |
| 5,256,929 | 10/1993 | Terajima | 310/326 |
| 5,270,607 | 12/1993 | Terajima | 310/316 |
| 5,341,061 | 8/1994 | Zaitsu | 310/318 |
| 5,349,857 | 9/1994 | Kasanami et al. | 73/505 |
| 5,355,034 | 10/1994 | Nakamura et al. | 307/409 |
| 5,400,269 | 3/1995 | White et al. | 364/570 |
| 5,412,204 | 5/1995 | Nakamura | 250/231.12 |
| 5,415,039 | 5/1995 | Nakamura et al. | 73/517 AV |
| 5,430,342 | 7/1995 | Watson | 310/316 |
| 5,434,467 | 7/1995 | Abe et al. | 310/366 |

FOREIGN PATENT DOCUMENTS

| | | |
|---|---|---|
| 0520467A2 | 6/1992 | European Pat. Off. . |
| 0520467A3 | 6/1992 | European Pat. Off. . |
| 0520468A2 | 6/1992 | European Pat. Off. . |
| 0579974 | 6/1993 | European Pat. Off. . |
| 0597338 | 10/1993 | European Pat. Off. . |
| 64-16911 | 1/1989 | Japan . |
| 618266 | 1/1994 | Japan . |
| 650761 | 2/1994 | Japan . |
| 6147899 | 5/1994 | Japan . |

OTHER PUBLICATIONS

"Patent Abstracts of Japan" vol. 13, No. 191, p. 867, Sep. 5, 1989.

*Primary Examiner*—Mark O. Budd
*Attorney, Agent, or Firm*—Ostrolenk, Faber, Gerb & Soffen, LLP

[57] ABSTRACT

To provide a small-sized and highly sensitive oscillation gyroscope, an oscillation gyroscope 20 includes a first through a seventh piezoelectric substrate 24a through 24g, the first through the seventh piezoelectric substrates 24a through 24g are respectively polarized in the same direction and are integrally laminated, a first lead electrode 26a, a second lead electrode 26b, a first driving electrode 28a and a second driving electrode 28b are formed in the first and the second piezoelectric substrates 24a and 24b, the first lead electrode 26a is connected to the first driving electrode 28a and the second lead electrode 26b is connected to the second driving electrode 28b, first through fifth divided electrodes 32a1 through 32e1 and 32a2 through 32e2 are formed in the third through the seventh piezoelectric substrates 24c through 24g, first ones of the first through the fifth divided electrodes 32a1 through 32e1 are mutually connected to one another and also to a third lead electrode 26c and second ones of the first through the fifth divided electrodes 32a2 through 32e2 are mutually connected to one another and also to a fourth lead electrode 26d.

20 Claims, 7 Drawing Sheets

OSCILLATION GYROSCOPE

BACKGROUND OF THE INVENTION

The present invention relates to an oscillation gyroscope, and particularly to, for example, an oscillation gyroscope applicable to a navigation system detecting a position of a moving body by detecting a rotational angular velocity and performing pertinent guidance or to an oscillation eliminating system which has a hand-hold-shift preventive device detecting a rotational angular velocity by external oscillation such as "hand hold shift" and pertinently damping it.

FIG. 8 is a perspective view showing an example of a conventional oscillation gyroscope. An oscillation gyroscope 1 includes an oscillator 2. The oscillator 2 includes an oscillating body 3 in a square rod shape made of a permanent elastic metal material. Detecting piezoelectric elements 4 are formed on a pair of opposing side faces of the oscillating body 3. Electrodes are formed on both faces of piezoelectric substrates in the detecting piezoelectric element 4. Further, driving piezoelectric elements 5 are respectively formed on a pair of side faces of the oscillating body 3 on which the detecting piezoelectric elements 4 are not formed. Electrodes are formed on both faces of a piezoelectric substrate in the driving piezoelectric element 5 as in the detecting piezoelectric element 4.

The oscillation gyroscope 1 is supported by supporting members 6 at node points of the oscillating body 3. When a drive signal is applied to the driving piezoelectric elements 5, the oscillator 2 performs a bending oscillation in a direction orthogonal to main faces of the driving piezoelectric elements 5.

When the oscillation gyroscope 1 is rotated centering on, for example, its axis under this state, a Coriolis force operates in a direction orthogonal to the direction of oscillation. Then, the direction of oscillation of the oscillating body 3 is changed by the Coriolis force and an output voltage is generated in the detecting piezoelectric elements 4. Further, the rotational angular velocity of the oscillation gyroscope 1 can be determined by measuring the output voltage.

FIG. 9 is a diagram showing another example of a conventional oscillation gyroscope. An oscillation gyroscope 10 includes an oscillator 11. The oscillator 11 includes a first piezoelectric substrate 12a and a second piezoelectric substrate 12b. The first piezoelectric substrate 12a and the second piezoelectric substrate 12b are polarized in mutually inverse thickness directions as shown by the arrows P in FIG. 9. Further, the first piezoelectric substrate 12a and the second piezoelectric substrate 12b are laminated and bonded to each other.

Two divided electrodes 13 are formed on a main face of the first piezoelectric substrate 12a with an interval in the width direction. Further, a common electrode 14 is formed on a main face of the second piezoelectric substrate 12b. A dummy electrode 15 is formed between the first piezoelectric substrate 12a and the second piezoelectric substrate 12b.

One output end of an oscillation circuit 16 as a driving means is connected to the two divided electrodes 13 of the oscillator 11 respectively via resistors 17a and 17b. The other output end of the oscillation circuit is connected to the common electrode 14 of the oscillator 11. Further, the two divided electrodes 13 of the oscillator 11 are respectively connected to a non-inverted input end and an inverted input end of a differential amplifier circuit 19 as a detecting means via resistors 18a and 18b. Furthermore, a resistor 18c is connected between an output end and the inverted input end of the differential amplifier circuit 19.

In the oscillation gyroscope 10, the first piezoelectric substrate 12a and the second piezoelectric substrate 12b are polarized in mutually inverse thickness directions. Accordingly, when a drive signal, for example, a sine wave signal is applied between the two divided electrodes 13 and the common electrode 14, the first piezoelectric substrate 12a and the second piezoelectric substrate 12b perform a stretching vibration mutually inversely. Therefore, the oscillator 11 performs a bending oscillation in a direction orthogonal to the main face thereof with portions a little inside from both end portions in the longitudinal direction as node portions.

However, in the conventional oscillation gyroscope 1 of a vibrating reed type shown in FIG. 8 and the conventional oscillation gyroscope 10 of a bi-morph type shown in FIG. 9, when the oscillator 2 or the oscillator 11 is small-sized, detection sensitivity of the rotational angular velocity is lowered.

SUMMARY OF THE INVENTION

A main object of the present invention is to provide an oscillation gyroscope which is small-sized and highly sensitive.

An oscillation gyroscope of the present invention includes a plurality of integrally laminated piezoelectric substrates which are polarized in the thickness direction, driving electrodes which are formed on some of the main faces of the piezoelectric substrates for subjecting the piezoelectric substrates to a bending oscillation, and a plurality of divided electrodes which are formed mutually oppositely in the thickness direction of the piezoelectric substrates for detecting a signal corresponding to a rotational angular velocity.

Further, the driving electrodes may include a first strip-like driving electrode, a second strip-like driving electrode which is formed oppositely to one main face of the first driving electrode and spaced from the first driving electrode by one of the piezoelectric substrates and a third strip-like driving electrode which is formed oppositely to the other main face of the first driving electrode and is spaced from the second driving electrode by another piezoelectric substrate.

Also, the oscillation gyroscope may include means, such as conductive through holes which extend in the thickness direction of the plurality of laminated piezoelectric substrates for mutually connecting first ones of the plurality of divided electrodes for mutually connecting second ones of the plurality of divided electrodes so that the first ones of the divided electrodes are connected in parallel and the second ones of the divided electrodes are connected in parallel.

Moreover, the oscillation gyroscope may include means, such as a plurality of conductive through holes which extend in the thickness direction of the plurality of laminated piezoelectric substrates for mutually connecting first ones of the divided electrodes and second ones of the other divided electrodes, both of which are formed at the mutually different piezoelectric substrates so that the first ones and the second ones of the divided electrodes are connected in series.

According to the present invention, the plurality of the divided electrodes are formed mutually oppositely in the thickness direction of the piezoelectric substrates and, accordingly, a considerable amount of charge generated by Coriolis force can be outputted and detection sensitivity of the rotational angular velocity is promoted.

Further, when the driving electrodes include the first strip-like driving electrode, the second strip-like driving electrode formed opposedly to the one main face of the first driving electrode and spaced from the first driving electrode by one of the piezoelectric substrate and the third strip-like driving electrode connected to the second driving electrode and formed opposedly to the other main face of the first driving electrode and is spaced from the second driving electrode by another piezoelectric substrate, the bending oscillation can efficiently be excited and an amount of bending per unit voltage is increased. Therefore, the detection sensitivity of the rotational angular velocity is not lowered even if the oscillation gyroscope is small-sized.

Further, when the oscillation gyroscope includes the through holes which extend in the thickness direction of the plurality of laminated piezoelectric substrates for mutually connecting the first ones of the plurality of divided electrodes for mutually connecting the second ones of the plurality of divided electrodes, output current is increased and the detection sensitivity is promoted.

Also, when the oscillation gyroscope includes the plurality of through holes extending in the thickness direction of the plurality of laminated piezoelectric substrates for mutually connecting the first one of the divided electrodes and the second one of the other divided electrodes, both of which are formed at the different piezoelectric substrates, output voltage is increased and the detection sensitivity is promoted.

According to the present invention a small-sized and highly sensitive oscillation gyroscope can be provided.

These and other objects, features and advantages of the invention will be apparent from the following description of preferred embodiments, as illustrated in the accompanying drawings.

DETAILED DESCRIPTION OF THE PREFERRED EMBODIMENTS

Figure 1:
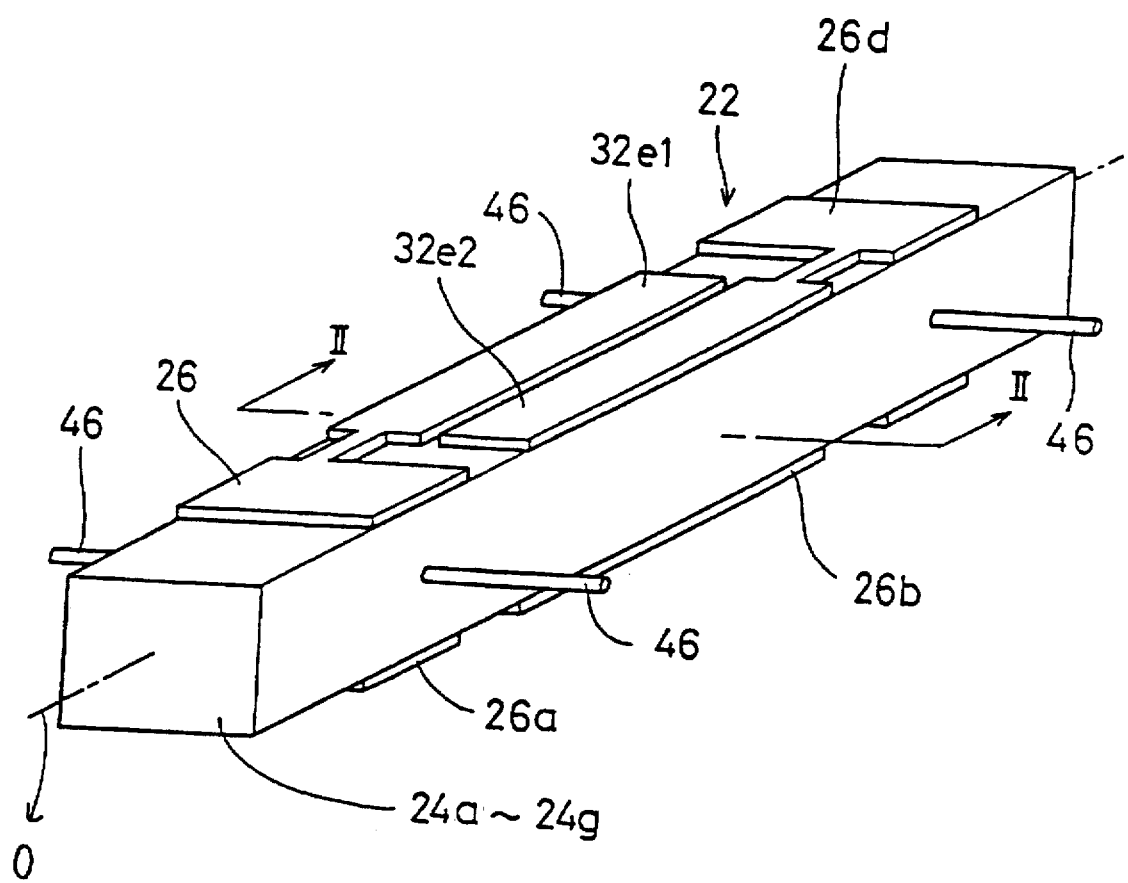
FIG. 1 is a perspective view showing an embodiment of the present invention.
Figure 2:
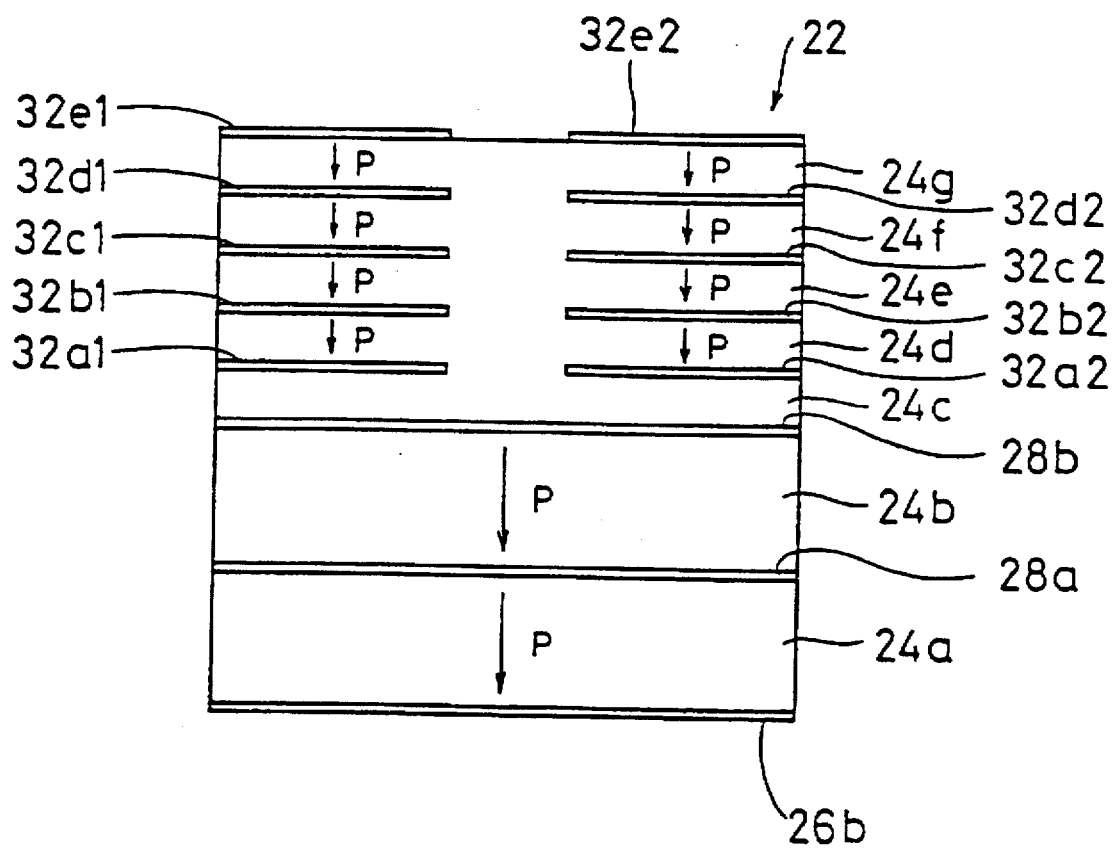
FIG. 2 is a sectional view taken from a line II—II in FIG. 1.
Figure 3:
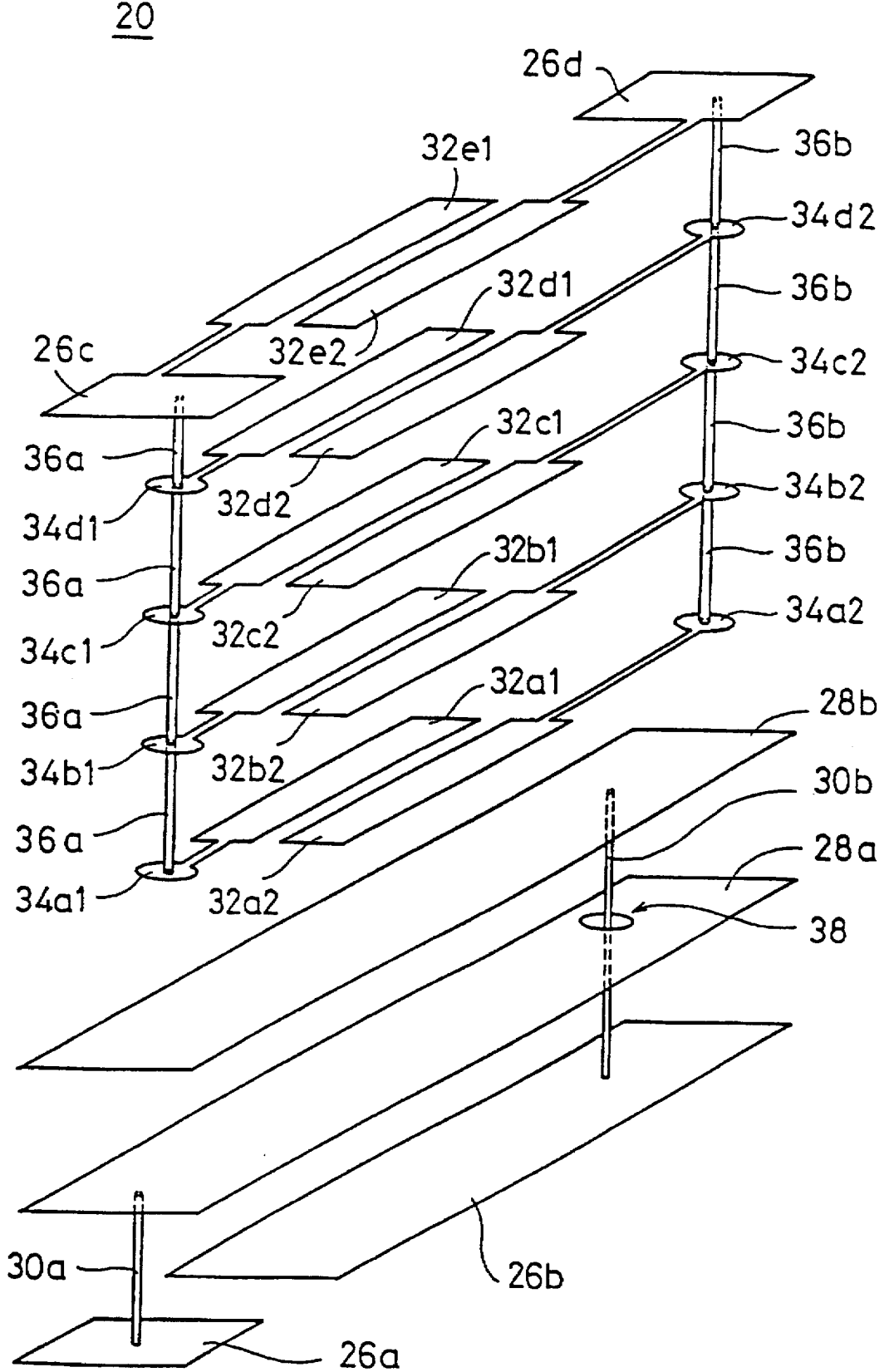
FIG. 3 is an exploded view showing connection of divided electrodes and driving electrodes in the embodiment of FIG. 1.

Referring now to the drawings and, particularly FIGS. 1-3, there is shown an embodiment of an oscillation gyroscope 20 in accordance with the invention which includes an oscillator 22 in a square rod shape. The oscillator 22 includes a first piezoelectric substrate 24a having a rectangular cross section. A lead electrode 26a in a strip-like shape is formed on one main face of the first piezoelectric substrate 24a, as shown in FIG. 3. Also, a second lead electrode 26b in a strip-like shape is formed on the one main face of the first piezoelectric substrate 24a separated from the first piezoelectric electrode 26a with an interval in the longitudinal direction. The second lead electrode 26b operates as one driving electrode for subjecting the oscillator 22 to a bending oscillation.

A first driving electrode 28a in a strip-like shape is formed on the other main face of the first piezoelectric substrate 24a for subjecting the oscillator 22 to a bending oscillation. The first driving electrode 28a is formed opposedly to one main face of the second lead electrode 26b via the first piezoelectric substrate 24a.

A conductive through hole 30a is formed in the first piezoelectric substrate 24a to penetrate it in the thickness direction. The first driving electrode 28a is connected to the first lead electrode 26a via the through hole 30a.

A second piezoelectric substrate 24b having a rectangular cross section is laminated above the first piezoelectric substrate 24a to cover one main face of the first driving electrode 28a. A second driving electrode 28b in a strip-like shape is formed on one face of the second piezoelectric substrate 24b opposedly to the one main face of the first driving electrode 28a in the thickness direction.

Also, a conductive through hole 30b is formed to penetrate through the first piezoelectric substrate 24a and the second piezoelectric substrate 24b in the thickness direction. In this case, a penetration hole 38 having, for example, a circular shape is formed in the first driving electrode 28a. The through hole 30b is formed to insert through the center of the penetration hole 38 while being insulated from the first driving electrode 28a. The second driving electrode 28b is connected to the second lead electrode 26b via the through hole 30b.

Moreover, a third piezoelectric substrate 24c having a rectangular cross section is laminated above the second piezoelectric substrate 24b to cover one main face of the second driving electrode 28b. First divided electrodes 32a1 and 32a2 having a long strip-like shape are formed on a face of the third piezoelectric substrate 24c opposed to the one main face of the second driving electrode 28b in the thickness direction.

The first divided electrodes 32a1 and 32a2 are formed in parallel separated by an interval in the width direction of the third piezoelectric substrate 24c. A land electrode 34a1 having an approximately circular shape is formed on one end side of the third piezoelectric substrate 24c in the longitudinal direction and a land electrode 34a2 having an approximately circular shape is formed on the other end side thereof in the longitudinal direction. Further, the first divided electrode 32a1 is extended to the one end side of the third piezoelectric substrate 24c in the longitudinal direction and is connected to the first land electrode 34a1. The first divided electrode 32a2 is extended to the other end side of the third piezoelectric substrate 24c in the longitudinal direction and is connected to the second land electrode 34a2.

Also, a fourth piezoelectric substrate 24d having a rectangular cross section is laminated above the third piezoelectric substrate 24c to cover one main face of the first divided electrodes 32a1 and 32a2. Second divided electrodes 32b1 and 32b2 having a long strip-like shape are formed on a face of the fourth piezoelectric substrate 24d opposed to one main face of the first divided electrodes 32a1 and 32a2 in the thickness direction thereof.

The second divided electrodes 32b1 and 32b2 are formed in parallel separated with an interval in the width direction of the fourth piezoelectric substrate 24d. A third land electrode 34b1 having an approximately circular shape is formed on one end side of the fourth piezoelectric substrate 24d in the longitudinal direction and a fourth land electrode 34b2 having an approximately circular shape is formed on the other end side thereof in the longitudinal direction. Further, the second divided electrode 32b1 is extended to the one end side of fourth piezoelectric substrate 24d in the longitudinal direction and is connected to the third land electrode 34b1. The second divided electrode 32b2 is extended to the other end side of the fourth piezoelectric substrate 24d in the longitudinal direction and is connected to the fourth land electrode 34b2.

Also, a fifth piezoelectric substrate 24e having a rectangular cross section is laminated above the fourth piezoelectric substrate 24d to cover one main face of the second divided electrodes 32b1 and 32b2. Third divided electrodes 32c1 and 32c2 having a long strip-like shape are formed on a face of the fifth piezoelectric substrate 24e opposed to one main face of the second divided electrodes 32b1 and 32b2 in the thickness direction.

The third divided electrodes 32c1 and 32c2 are formed in parallel separated with an interval in the width direction of the fifth piezoelectric substrate 24e. Further, a fifth land electrode 34c1 having an approximately circular shape is formed on one end side of the fifth piezoelectric substrate 24e in the longitudinal direction and a sixth land electrode 34c2 having an approximately circular shape is formed on the other end side thereof in the longitudinal direction. The third divided electrode 32c1 is extended to the one end side of the fifth piezoelectric substrate 24e in the longitudinal direction and is connected to the fifth land electrode 34c1. The third divided electrode 32c2 is extended to the other end side of the fifth piezoelectric substrate 24e in the longitudinal direction and is connected to the sixth land electrode 34c2.

A sixth piezoelectric substrate 24f having a rectangular cross section is laminated above the fifth piezoelectric substrate 24e to cover one main face of the third divided electrodes 32c1 and 32c2. Fourth divided electrodes 32d1 and 32d2 having a long strip-like shape are formed on a face of the fifth piezoelectric substrate 24f opposed to one main face of the third divided electrodes 32c1 and 32c2 in the thickness direction.

The fourth divided electrodes 32d1 and 32d2 are formed in parallel separated with an interval in the width direction of the sixth piezoelectric substrate 24f. A seventh land electrode 34d1 having an approximately circular shape is formed on one end side of the sixth piezoelectric substrate 24f in the longitudinal direction and an eighth land electrode 34d2 having an approximately circular shape is formed on the other end side thereof in the longitudinal direction. The fourth divided electrode 32d1 is extended on the one end side of the sixth piezoelectric substrate 24f in the longitudinal direction and is connected to the seventh land electrode 34d1. The fourth divided electrode 32d2 is extended on the other end side of the sixth piezoelectric substrate 24f in the longitudinal direction and is connected to the eighth land electrode 34d2.

Further, a seventh piezoelectric substrate 24g having a rectangular cross section is laminated above the sixth piezoelectric substrate 24f to cover one main face of the fourth divided electrodes 32d1 and 32d2. Fifth divided electrodes 32e1 and 32e2 having a long strip-like shape are formed on a face of the seventh piezoelectric substrate 24g opposed to one main face of the fourth divided electrodes 32d1 and 32d2 in the thickness direction.

The fifth divided electrodes 32e1 and 32e2 are formed in parallel separated with an interval in the width direction of the seventh piezoelectric substrate 24g. A third lead electrode 26c having an approximately rectangular shape is formed on one end side of the seventh piezoelectric substrate 24g in the longitudinal direction and a fourth lead electrode 26d having an approximately rectangular shape is formed on the other end side thereof in the longitudinal direction. The fifth divided electrode 32e1 is extended on the one end side of the seventh piezoelectric substrate 24g in the longitudinal direction and is connected to the third lead electrode 26c. The fifth divided electrode 32e2 is extended on the other end side of the seventh piezoelectric substrate 24g in the longitudinal direction and is connected to the fourth lead electrode 26d.

Then, the first through the seventh piezoelectric substrates 24a through 24g are integrally laminated. In this embodiment the first through the seventh piezoelectric substrates 24a through 24g are respectively polarized in a direction from the seventh piezoelectric substrate 24g toward the first piezoelectric substrate 24a. Accordingly, the first through the seventh piezoelectric substrates 24a through 24g are respectively polarized in the same direction as shown by the arrows P of FIG. 2.

A conductive through hole 36a extending in the thickness direction is formed in the vicinities of first ends of the laminated first through seventh piezoelectric substrates 24a through 24g in the longitudinal direction and a conductive through hole 36b extending in the thickness direction is formed in the vicinities of the other ends thereof in the longitudinal direction. The first, the third, the fifth and the seventh land electrodes 34a1, 34b1, 34c1 and 34d1 and the third lead electrode 26c are mutually connected by the through hole 36a. Also, the second, the fourth, the sixth and the eighth land electrodes 34a2, 34b2, 34c2 and 34d2 and the fourth lead electrode 26d are mutually connected by the through hole 36b. Accordingly, the first through the fifth divided electrodes 32a1 through 32e1 and 32a2 through 32e2 are connected in parallel at the inside of the first through the seventh laminated piezoelectric substrates 24a through 24g.

Next, an explanation of electric connection of the oscillation gyroscope 20 will be given in reference to FIG. 4. The oscillation gyroscope 20 includes a differential amplifier circuit 40 as a detecting means. A non-inverted amplifier terminal of the differential amplifier circuit 40 is connected to the lead electrode 26c via a resistor 44a. An inverted amplifier terminal of the differential amplifier circuit 40 is connected to the lead electrode 26d via a resistor 44b. An output terminal of the differential amplifier circuit 40 and the inverted amplifier terminal are mutually connected via a resistor 44c.

The oscillation gyroscope 20 includes an oscillating circuit 42 as a driving means for applying drive signals on the oscillator 22. One output end of the oscillating circuit 42 is connected to the first lead electrode 26a and the other output end thereof is connected to the second lead electrode 26b.

Next, an explanation of the operation of the oscillation gyroscope 20 will be given. In the oscillation gyroscope 20 a drive signal such as a sine wave signal outputted from the oscillating circuit 42 is applied between the lead electrodes 26a and 26b. Then, the first piezoelectric substrate 24a and the second piezoelectric substrate 24b perform a stretching oscillation mutually inversely. That is, when the first piezoelectric substrate 24a is elongated in a first direction in parallel with its main face, the second piezoelectric substrate 24b is contracted in an opposite second direction in parallel with its main face. Conversely, when the first piezoelectric substrate 24a is contracted in the second direction in parallel with its main face, the second piezoelectric substrate 24b is elongated in the first direction in parallel with its main face. Therefore, as shown in FIG. 5, the oscillator 22 performs a bending oscillation in a direction orthogonal to the main faces of the first through the seventh piezoelectric substrates 24a through 24g with portions a little inside from the both end portions in the longitudinal direction as node portions.

Figure 5:
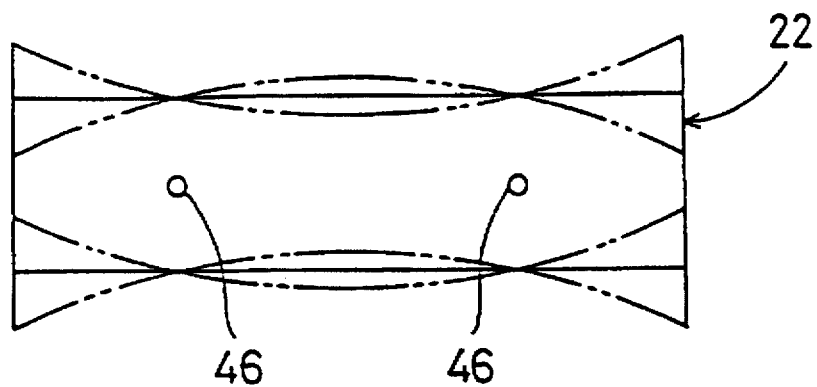
FIG. 5 is a diagram showing a bending oscillation of the oscillation gyroscope of FIG. 1.

As shown in FIG. 1 and FIG. 5, supporting members 46 having a stick-like shape, for example, are respectively attached to the vicinities of the node portions of the oscillator 22. Also, the oscillator 22 is supported by these supporting members 46. Incidentally, it is possible to support the oscillator 22 without considerably influencing on the oscillation even when the supporting members 46 are attached to the vicinities of the node portions on the top face or the bottom face of the oscillator 22.

Next, when the oscillation gyroscope 20 is rotated centering on a center axis O of the oscillator 22 (FIG. 1) in a state where the oscillator 22 performs the bending oscillation, a Coriolis force in correspondence with the rotational angular velocity operates in a direction in parallel with the main faces of the first through the seventh piezoelectric substrates 24a through 24g and orthogonal to the center axis O of the oscillator 22. Accordingly, the direction of the bending oscillation of the oscillator 22 is changed. Therefore, a signal in correspondence with the rotational angular velocity is generated between the first divided electrode 32a1 and the first divided electrode 32a2. Similarly, signals in correspondence with the rotational angular velocity are respectively generated among the second through the fifth divided electrodes 32b1 through 32e1 and 32b2 through 32e2, respectively. In this embodiment the first through the fifth divided electrodes 32a1 through 32e1 and 32a2 through 32e2 are connected in parallel and therefore, the generated signals can be outputted as a comparatively large voltage from the third lead electrode 24c and the fourth lead electrode 24d. The third lead electrode 24c and the fourth lead electrode 24d are connected to the differential amplifier circuit 40 via the resistors 44a and 44b. Therefore, the signals generated at the first through the fifth divided electrodes 32a1 through 32e1 and 32a2 through 32e2 are detected by the differential amplifier circuit 40. Accordingly, the rotational angular velocity can be found by an output signal of the differential amplifier circuit 40 in this oscillation gyroscope 20.

To manufacture the oscillation gyroscope 20, a plurality of ceramics green sheets for fabricating the first through the seventh piezoelectric substrates 24a through 24g are prepared. The above-mentioned respective electrodes are formed on these ceramics green sheets by, for example, thick film printing or the like. In this case, the same electrode pattern is repeatedly formed on one sheet of the ceramics green sheets. Further, the first through the seventh piezoelectric substrates 24a through 24g are polarized respectively in the same thickness direction.

Figure 6:
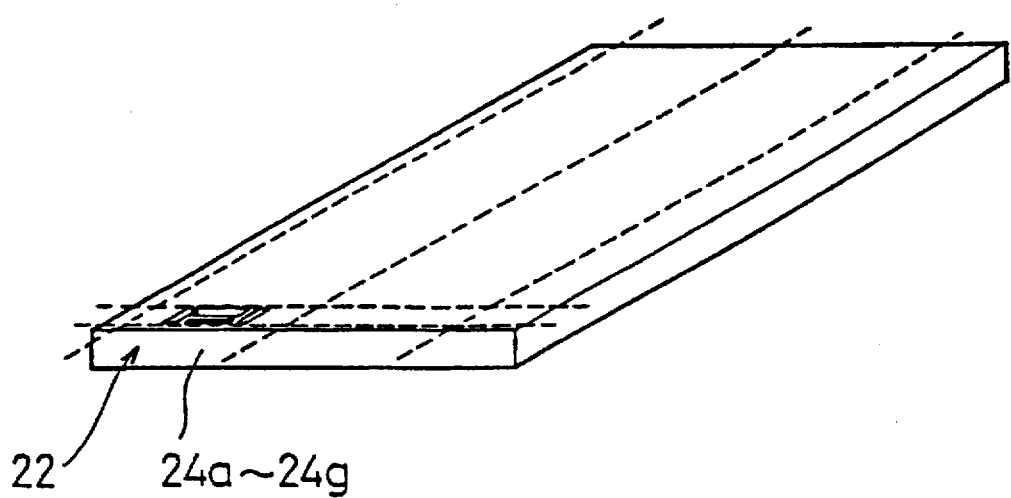
FIG. 6 is a diagram showing a manufacturing step of the oscillation gyroscope of FIG. 1.

The plurality of ceramics green sheets are laminated such that the respective electrode patterns are connected as mentioned above. As shown in FIG. 6, the laminated ceramics green sheets are cut at portions designated by broken lines. Further, the respective cut laminated bodies are sintered and a plurality of the oscillators 22 are formed.

Further, the respective supporting members 46 are attached to the oscillator 22. The differential amplifier circuit 40 and the oscillating circuit 42 are connected to the respective lead electrodes 26a through 26d of the oscillator 22.

In the embodiment of FIG. 1 the first through the fifth divided electrodes 32a1 through 32e1 and 32a2 through 32e2 are provided to detect the signals corresponding to the rotational angular velocity and these are connected in parallel and accordingly, the large output voltage corresponding to the Coriolis force can be provided by which the detection sensitivity of the rotational angular velocity is promoted.

Further, the second lead electrode 26b, the first driving electrode 28a and the second driving electrode 28b as the driving electrodes are formed by the above-mentioned structure and therefore, the oscillator 22 laminated with the first through the seventh piezoelectric substrates 24a through 24g with all the polarizing directions in the same direction, can be subjected to the bending oscillation. A displacement of bending of the oscillator 22 per unit voltage is increased. Accordingly, miniaturizing of the oscillator and promotion of the detection sensitivity of the rotational angular velocity can be achieved.

Therefore, according to the embodiment of FIG. 1 a small-sized and highly sensitive oscillation gyroscope 20 can be provided.

In this oscillation gyroscope 20 the oscillator 22 is supported by the supporting members 46 attached to the vicinities of the node portions and therefore, oscillation is difficult to propagate from the oscillator 22 to the outside and the oscillator 22 can efficiently be oscillated.

Furthermore, in the oscillation gyroscope 20 a plurality of the oscillator 22 can be mass-produced by the above-mentioned simple method and therefore, the mass production performance is excellent.

Figure 7:
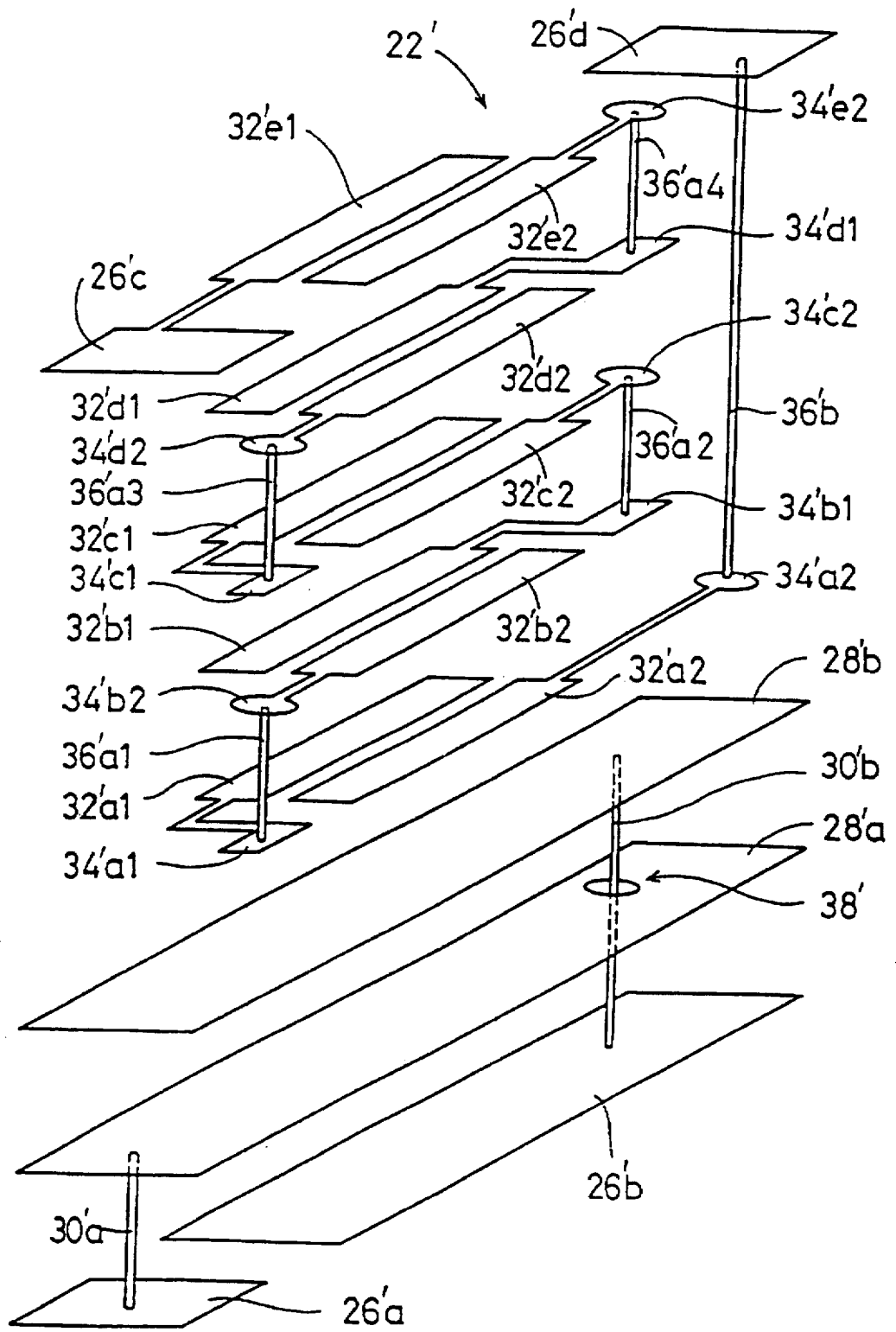
FIG. 7 is an exploded view showing connection of divided electrodes and driving electrodes of another embodiment of the present invention.
Figure 8:
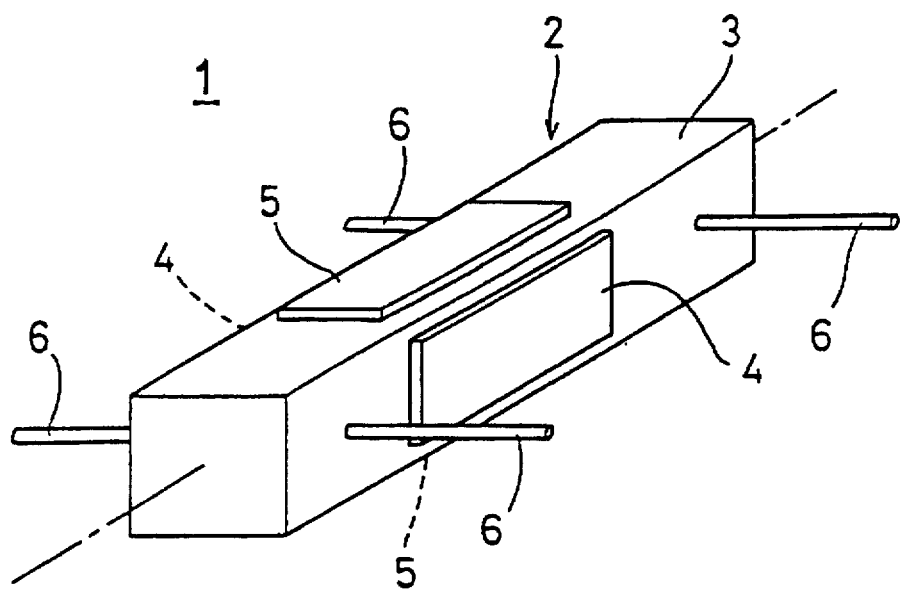
FIG. 8 is a perspective view showing an example of a conventional oscillation gyroscope.
Figure 9:
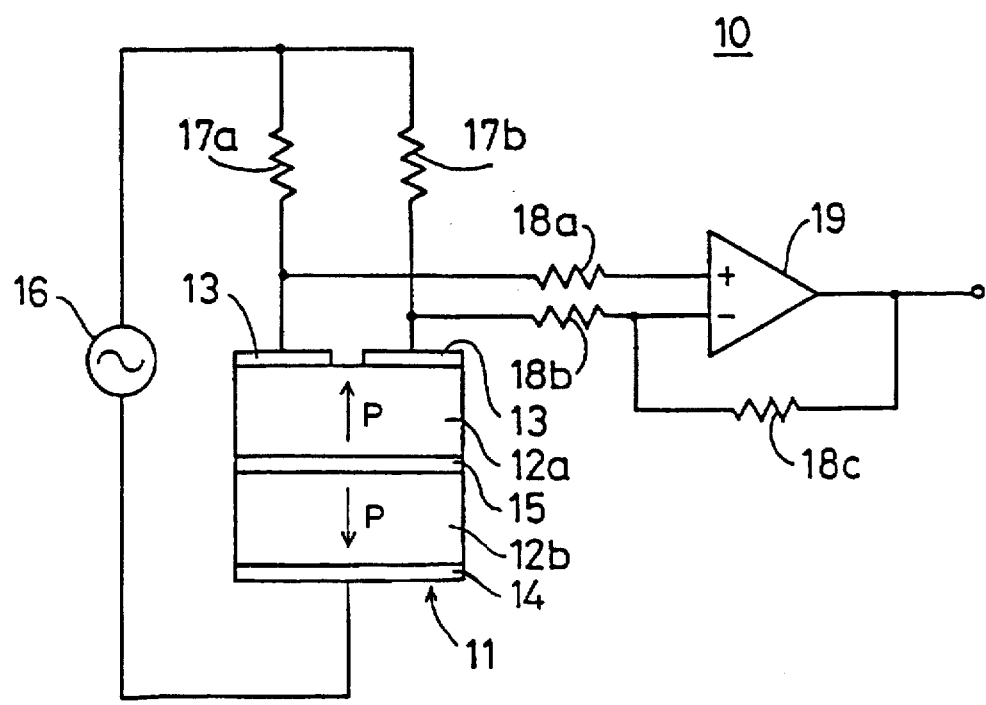
FIG. 9 is a diagram showing another example of a conventional oscillation gyroscope.

FIG. 7 is an exploded view showing connection of divided electrodes and driving electrodes of another embodiment of the present invention in which elements which are the same as or similar to the corresponding elements in the first embodiments have the same reference numerals primed. The oscillator 22' includes the first piezoelectric substrate 24'a having a rectangular cross section similar to that of FIG. 2. The first lead electrode 26'a in a strip-like shape is formed on the one main face of the first piezoelectric substrate 24'a. The second lead electrode 26'b in a strip-like shape is formed on the one main face of the first piezoelectric substrate 24'a separated from the first lead electrode 26'a with an interval in the longitudinal direction. The second lead electrode 26'b operates as one of the driving electrodes for subjecting the oscillator 22' in a bending oscillation.

The first driving electrode 28'a in a strip-like shape is formed on the other main face of the first piezoelectric substrate 24'a for subjecting the oscillator 22' in a bending oscillation. The first driving electrode 28'a is formed opposedly to the one main face of the second lead electrode 26'b via the first piezoelectric substrate 24'a.

The conductive through hole 30'a is formed to penetrate the first piezoelectric substrate 24'a in the thickness direction. The first driving electrode 28'a is connected to the first lead electrode 26'a via the through hole 30'a.

The second piezoelectric substrate 24'b having a rectangular cross section is laminated above the first piezoelectric substrate 24'a to cover the one main face of the first driving electrode 28'a similar to that shown in FIG. 2. The second driving electrode 28'b in a strip-like shape is formed on the face of the second piezoelectric substrate 24'b opposed to the one main face of the first driving electrode 28'a in the thickness direction.

The conductive through hole 30'b is formed to penetrate the first piezoelectric substrate 24'a and the second piezoelectric substrate 24'b in the thickness direction. In this case, the penetration hole 38' having, for example, a circular shape is formed in the first driving electrode 28'a. Further, the through hole 30'b is formed to insert through the center of the penetration hole 38' while being insulated from the first driving electrode 28'a. The second driving electrode 28'b is connected to the second lead electrode 26'b via the through hole 30'b.

The third piezoelectric substrate 24'c having a rectangular cross section is laminated above the second piezoelectric substrate 24'b to cover the one main face of the second drive electrode 28'b similar to that shown in FIG. 2. First divided electrodes 32'a1 and 32'a2 in a long strip-like shape are formed on the face of the third piezoelectric substrate 24'c opposed to the one main face of the second driving electrode 28'b in the thickness direction.

The first divided electrodes 32'a1 and 32'a2 are formed in parallel separated with an interval in the width direction of the third piezoelectric substrate 24'c. A first land electrode 34'a1 in an approximately rectangular shape is formed on one end side of the third piezoelectric substrate 24'c in the longitudinal direction and a second land electrode 34'a2 in an approximately circular shape is formed on the other end side thereof in the longitudinal direction. In this embodiment the first land electrode 34'a1 is arranged on the one end side of the first divided electrode 32'a1 and the second land electrode 34'a2 is arranged on the other end side of the first divided electrode 32'a2 in the longitudinal direction. Further, the first divided electrode 32'a1 is extended in an approximately L-shape on the one end side of the third piezoelectric substrate 24'c in the longitudinal direction and is connected to the first land electrode 34'a1. The first divided electrode 32'a2 is extended to the other end side of the third piezoelectric substrate 24'c in the longitudinal direction and is connected to the second land electrode 34'a2.

The fourth piezoelectric substrate 24'd having a rectangular cross section is laminated above the third piezoelectric substrate 24'c to cover the one main face of the first divided electrodes 32'a1 and 32'a2 similar to that shown in FIG. 2. Second divided electrodes 32'b1 and 32'b2 in a long strip-like shape are formed on the face of the fourth piezoelectric substrate 24'd opposed to the one main face of the first divided electrodes 32'a1 and 32'a2 in the thickness direction thereof.

The second divided electrodes 32'b1 and 32'b2 are formed in parallel separated with an interval in the width direction of the fourth piezoelectric substrate 24'd. A third land electrode 34'b1 in an approximately rectangular shape is formed on the other end side of the fourth piezoelectric substrate 24'd in the longitudinal direction and a fourth land electrode 34'b2 in an approximately circular shape is formed on the one end side thereof in the longitudinal direction. In this embodiment the third land electrode 34'b1 is arranged on the other end side of the second divided electrode 32'b2 in the longitudinal direction and the fourth land electrode 34'b2 is arranged on the one end side of the second divided electrode 32'b2 in the longitudinal direction. That is, the fourth land electrode 34'b2 is formed right above the first land electrode 34'a1. Further, the second divided electrode 32'b1 is extended in an approximately L-shape on the other end side of the fourth piezoelectric substrate 24'd in the longitudinal direction and is connected to the third land electrode 34'b1. The second divided electrode 32'b2 is extended on the one end side of the fourth piezoelectric substrate 24'd in the longitudinal direction and is connected to the fourth land electrode 34'b2.

The fifth piezoelectric substrate 24'e having a rectangular cross section is laminated above the fourth piezoelectric substrate 24'd to cover the one main face of the second divided electrodes 32'b1 and 32'b2 similar to that shown in FIG. 2. Third divided electrodes 32'c1 and 32'c2 in a long strip-like shape are formed on the face of the fifth piezoelectric substrate 24'e opposed to the one main face of second divided electrodes 32'b1 and 32'b2 in the thickness direction.

The third divided electrodes 32'c1 and 32'c2 are formed in parallel separated with an interval in the width direction of the fifth piezoelectric substrate 24'e. A fifth land electrode 34'c1 in an approximately rectangular shape is formed on one end side of the fifth piezoelectric substrate 24'e in the longitudinal direction and a sixth land electrode 34'c2 in an approximately circular shape is formed on the other end side thereof in the longitudinal direction. In this embodiment the fifth land electrode 34'c1 is arranged on the one end side of the third divided electrode 32'c2 in the longitudinal direction and the sixth land electrode 34'c2 is arranged on the other end side of the third divided electrode 32'c2 in the longitudinal direction. That is, the fifth land electrode 34'c1 is formed right above the fourth land electrode 34'b2 and the sixth land electrode 34'c2 is formed right above the third land electrode 34'b1. Further, the third divided electrode 32'c1 is extended in an approximately L-shape on the one end side of the fifth piezoelectric substrate 24'e in the longitudinal direction and is connected to the fifth land electrode 34'c1. The third divided electrode 32'c2 is extended on the other end side of the fifth piezoelectric substrate 24'e in the longitudinal direction and is connected to the sixth land electrode 34'c2.

A sixth piezoelectric substrate 24'f having a rectangular cross section is laminated above the fifth piezoelectric substrate 24'e to cover one main face of the third divided electrodes 32'c1 and 32'c2. Fourth divided electrodes 32'd1 and 32'd2 are formed on the face of the sixth piezoelectric substrate 24'f opposed to the one main face of the third divided electrodes 32'c1 and 32'c2.

The fourth divided electrodes 32'd1 and 32'd2 are formed in parallel separated with an interval in the width direction of the sixth piezoelectric substrate 24'f. A seventh land electrode 34'd1 in an approximately rectangular shape is formed on the other end side of the sixth piezoelectric substrate 24'f in the longitudinal direction and an eighth land electrode 34'd2 in an approximately circular shape is formed on the one end side thereof in the longitudinal direction. In this embodiment the seventh land electrode 34'd1 is arranged on the other end side of the fourth divided electrode 32'd2 in the longitudinal direction and the eighth land electrode 34'd2 is arranged on the one end side of the fourth divided electrode 32'd2 in the longitudinal direction. That is, the seventh land electrode 34'd1 is formed right above the sixth land electrode 34'c2 and the eighth land electrode 34'd2 is formed right above the fifth land electrode 34'c1. Further, the fourth divided electrode 32'd1 is extended in an approximately L-shape on the other end side of the sixth piezoelectric substrate 24'f in the longitudinal direction and is connected to the seventh land electrode 34'd1. The fourth divided electrode 32'd2 is extended to the one end side of the sixth piezoelectric substrate 24'f in the longitudinal direction and is connected to the eighth land electrode 34'd2. Further, the seventh piezoelectric substrate 24'g having a rectangular cross section is laminated above the sixth piezoelectric substrate 24'f to cover one main face of the fourth divided electrodes 32'd1 and 32'd2 similar to that shown in FIG. 2. Fifth divided electrodes 32'e1 and 32'e2 in a long strip-shape are formed on a face of the seventh piezoelectric substrate 24'g opposed to the one main face of the fourth divided electrodes 32'd1 and 32'd2.

The fifth divided electrodes 32'e1 and 32'e2 are formed in parallel separated with an interval in the width direction of the seventh piezoelectric substrate 24'g. A third lead electrode 26'c in an approximately rectangular shape is formed on the one end side of the seventh piezoelectric substrate 24'g in the longitudinal direction and a ninth land electrode 34'e2 in an approximately circular shape is formed on the other end side thereof in the longitudinal direction. Further, the fifth divided electrode 32'e1 is extended on the one end side of the seventh piezoelectric substrate 24'g in the longitudinal direction and is connected to the third lead electrode 26'c. The fifth divided electrode 32'e2 is extended on the other end side of the seventh piezoelectric substrate 24'g in the longitudinal direction and is connected to the ninth land electrode 34'e2.

Further, a fourth lead electrode 26'd in an approximately rectangular shape is formed on the other end side of the seventh piezoelectric substrate 24'g in the longitudinal direction.

Furthermore, a conductive through hole 36'a1 extending in the thickness direction is formed in the vicinity of the one end of the fourth piezoelectric substrate 24'd in the longitudinal direction. The first land electrode 34'a1 and the fourth land electrode 34'b2 are mutually connected by the through hole 36'a1. A conductive through hole 36'a2 extending in the thickness direction is formed on the other end side of the fifth piezoelectric substrate 24'e in the longitudinal direction. The third land electrode 34'b1 and the sixth land electrode 34'c2 are mutually connected by the through hole 36'a2. A conductive through hole 36'a3 extending in the thickness direction is formed in the vicinity of the one end of the sixth piezoelectric substrate 24'f in the longitudinal direction. The fifth land electrode 34'c1 and the eighth land electrode 34'd2 are mutually connected by the through hole 36'a3. A conductive through hole 36'a4 extending in the thickness direction is formed on the other end side of the seventh piezoelectric substrate 24'g in the longitudinal direction. The seventh land electrode 34'd1 and the ninth land electrode 34'e2 are mutually connected by the through hole 36'a4. Further, a conductive through hole 36'b is formed to insert through in the thickness direction the vicinities of the other ends of the fourth through the seventh piezoelectric substrates 24'd through 24'g in the longitudinal direction. The second land electrode 34'a2 and the fourth lead electrode 26'd are mutually connected by the through hole 36'b.

Accordingly, the first through the fifth divided electrodes 32'a1 through 32'e1 and 32'a2 through 32'e2 are connected in series at the inside of the laminated first through seventh piezoelectric substrates 24'a through 24'g.

The first through the seventh piezoelectric substrates 24'a through 24'g are integrally laminated and the oscillator 22' similar to that shown in FIG. 1 and FIG. 2 is formed. Also in the embodiment shown in FIG. 7, the first through the seventh piezoelectric substrates 24'a through 24'g are polarized in the direction from the seventh piezoelectric substrate 24'g toward the first piezoelectric substrate 24'a as shown by the arrows P in FIG. 2.

Figure 4:
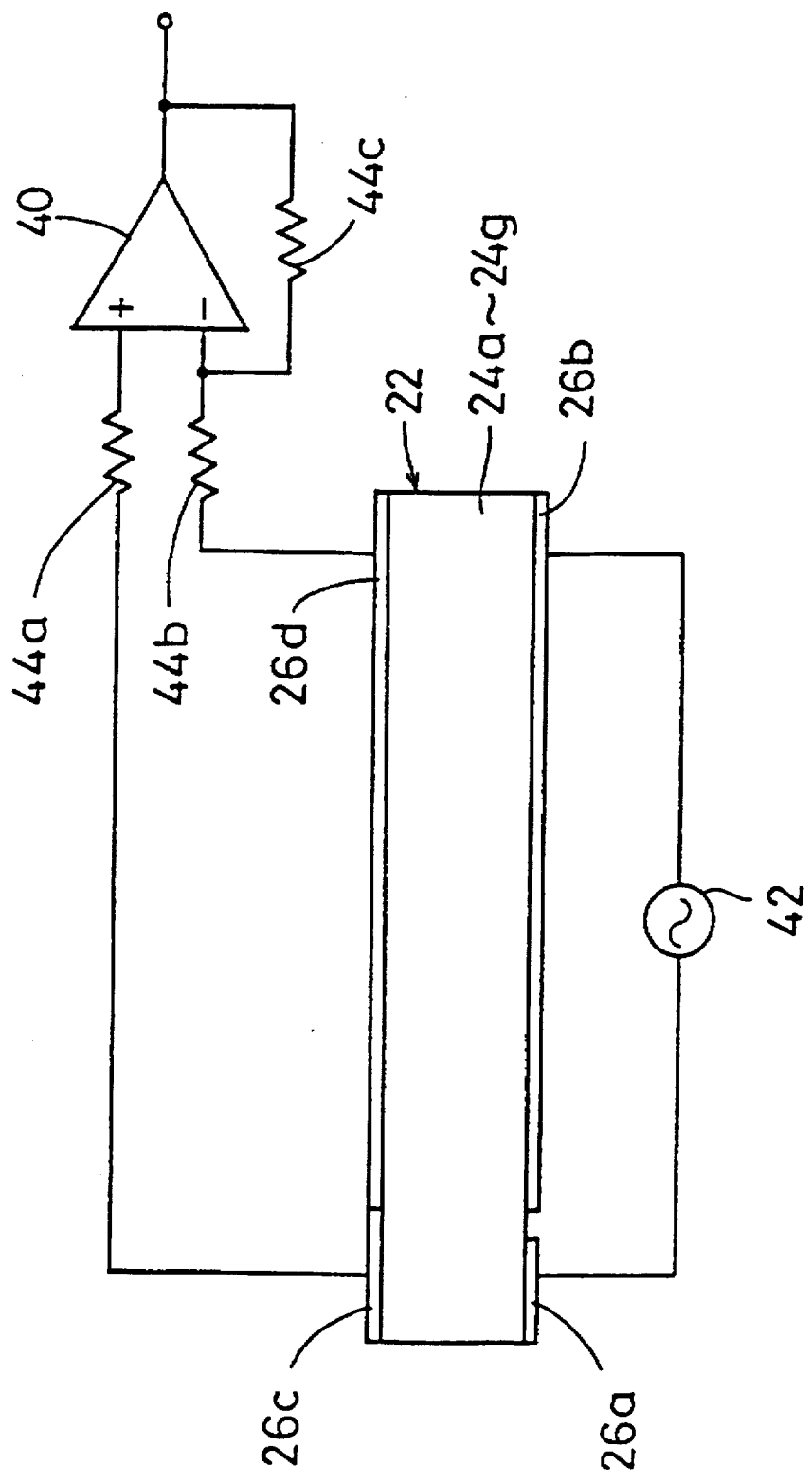
FIG. 4 is a diagram showing electrical connection of the oscillation gyroscope shown in FIG. 1.

The oscillation gyroscope 20' having the structure of FIG. 7 is connected to the differential amplifier circuit 40 as the detecting means and the oscillating circuit 42 similar to that shown by FIG. 4.

An effect similar to that of the embodiment of FIG. 3 can be provided to the oscillation gyroscope 20' having the structure of FIG. 7. Further,in this case the first through the fifth divided electrodes 32'a1 through 32'e1 and 32'a2 through 32'e2 are connected in series and, accordingly, output current is increased and promotion of detection sensitivity can be achieved.

Although the present invention has been described in relation to particular embodiments thereof, many other variations and modifications and other uses will become apparent to those skilled in the art. It is preferred, therefore, that the present invention be limited by the specific disclosure herein, but only by the appended claims.

What is claimed is:

1. An oscillation gyroscope comprising:
    a plurality of integrally laminated piezoelectric substrates, each polarized in a thickness direction;
    driving electrodes formed on main faces of some of the plurality of piezoelectric substrates for subjecting the plurality of piezoelectric substrates to a bending oscillation; and
    a plurality of divided electrodes formed mutually opposedly on other of the plurality of piezoelectric substrates for detecting a signal corresponding to a rotational angular velocity.

2. The oscillation gyroscope according to claim 1, wherein the driving electrodes comprise:
    a first strip-like driving electrode formed intermediate first and second ones of the plurality of piezoelectric elements;
    a second strip-like driving electrode formed opposedly to one main face of the first driving electrode and spaced from the first driving electrode by the first one of the plurality of piezoelectric substrates; and
    a third strip-like driving electrode connected to the second driving electrode and formed opposedly to the other main face of the first driving electrode and spaced from the first driving electrode by the second one of the plurality of piezoelectric substrates.

3. The oscillation gyroscope according to claim 1, further comprising:
    means extending in the thickness direction of the plurality of laminated piezoelectric substrates for mutually connecting first ones of the plurality of divided electrodes and for mutually connecting second ones of the plurality of divided electrodes so that the first ones of each divided electrode are connected in parallel with each other and the second ones of each divided pair are connected in parallel with each other.

4. The oscillation gyroscope according to claim 2, further comprising:
    means extending in the thickness direction of the plurality of laminated piezoelectric substrates for mutually connecting first ones of the plurality of divided electrodes and for mutually connecting second ones of the plurality of divided electrodes so that the first ones of each divided electrode are connected in parallel with each other and the second ones of each divided pair are connected in parallel with each other.

5. The oscillation gyroscope according to claim 4, wherein the mutually connecting means comprise conductive through holes.

6. The oscillation gyroscope according to claim 5, wherein the first one of the plurality of piezoelectric substrates and the second one of the plurality of piezoelectric substrates are adjacent to one another.

7. The oscillation gyroscope according to claim 1, further comprising means extending in the thickness direction of the plurality of laminated piezoelectric substrates for mutually connecting first ones and second ones of the plurality of divided electrodes which are formed on mutually different ones of the plurality of piezoelectric substrates so that the first ones and second ones of each divided electrode are connected in series.

8. The oscillation gyroscope according to claim 7, wherein the mutually connecting means comprise conductive through holes.

9. The oscillation gyroscope according to claim 2, further comprising means extending in the thickness direction of the plurality of laminated piezoelectric substrates for mutually connecting first ones and second ones of the plurality of divided electrodes which are formed on mutually different ones of the plurality of piezoelectric substrates so that the first ones and second ones of each divided electrode are connected in series.

10. The oscillation gyroscope according to claim 9, wherein the mutually connecting means comprise conductive through holes.

11. The oscillation gyroscope according to claim 10, wherein the first one of the plurality of piezoelectric substrates and the second one of the plurality of piezoelectric substrates are adjacent to one another.

12. An oscillation gyroscope comprising:

a plurality of integrally laminated piezoelectric substrates, each polarized in a thickness direction;

driving electrodes formed on main faces of some of the plurality of piezoelectric substrates;

a plurality of divided electrodes formed mutually opposedly on other of the plurality of piezoelectric substrates;

an oscillation circuit connected to the driving electrodes for subjecting the plurality of piezoelectric substrates to a bending oscillation; and a differential amplifier connected to the divided electrodes for detecting a signal corresponding to a rotational angular velocity.

13. The oscillation gyroscope according to claim 12, wherein the driving electrodes comprise:

a first strip-like driving electrode formed intermediate first and second ones of the plurality of piezoelectric elements;

a second strip-like driving electrode formed opposedly to one main face of the first driving electrode and spaced from the first driving electrode by the first one of the plurality of piezoelectric substrates; and a third strip-like driving electrode connected to the second driving electrode and formed, opposedly to other main face of the first driving electrode and spaced from the first driving electrode by the second one of the plurality of piezoelectric substrates.

14. The oscillation gyroscope according to claim 13, wherein the oscillation circuit has first and second outputs, the first output being connected to the first driving electrode and the second output being connected to the third driving electrode.

15. The oscillation gyroscope according to claim 14, further comprising:

a plurality of conductive through holes extending in the thickness direction of the plurality of laminated piezoelectric substrates for mutually connecting first ones of the plurality of divided electrodes and for mutually connecting second ones of the plurality of divided electrodes so that the first ones of each divided electrode are connected in parallel with each other and the second ones of each divided pair are connected in parallel with each other.

16. The oscillation gyroscope according to claim 15, wherein the first output of the oscillation circuit is connected to the drive electrode through a lead electrode and a conductive through hole.

17. The oscillation gyroscope according to claim 16, wherein the first one of the plurality of piezoelectric substrates and the second one of the plurality of piezoelectric substrates are adjacent to one another.

18. The oscillation gyroscope according to claim 12, further comprising a plurality of conductive through holes extending in the thickness direction of the plurality of laminated piezoelectric substrates for mutually connecting first ones and second ones of the plurality of divided electrodes which are formed on mutually different ones of the plurality of piezoelectric substrates so that the first ones and second ones of each divided electrode are connected in series.

19. The oscillation gyroscope according to claim 14, wherein the first output of the oscillation circuit is connected to the first driving electrode through a lead electrode and a conductive through hole.

20. The oscillation gyroscope according to claim 19, wherein the first one of the plurality of piezoelectric substrates and the second one of the plurality of piezoelectric substrates are adjacent to one another.

* * * * *